United States Patent [19]

Jansen et al.

[11] 4,152,736

[45] May 1, 1979

[54] MAGNETIC DISK FILE

[75] Inventors: Robert E. Jansen; Warren A. Lopour; Lawrence P. Segar, all of Rochester, Minn.

[73] Assignee: International Business Machines Corporation, Armonk, N.Y.

[21] Appl. No.: 683,578

[22] Filed: May 5, 1976

Related U.S. Application Data

[63] Continuation of Ser. No. 546,066, Jan. 31, 1975, abandoned.

[51] Int. Cl.² .............................................. G11B 21/08
[52] U.S. Cl. ..................................................... 360/78
[58] Field of Search ........................... 360/106, 77, 78

[56] References Cited

U.S. PATENT DOCUMENTS 3,263,031 7/1966 Welsh ..................................... 360/77

3,781,490 12/1973 Phillips ................................... 360/78

OTHER PUBLICATIONS

Elliott, Accessing Technique for Magnetic Disks, IBM Tech. Disc. Bull., vol. 17, No. 5, Oct. 1974, p. 1464.

*Primary Examiner*—Robert S. Tupper
*Attorney, Agent, or Firm*—Keith T. Bleuer

[57] ABSTRACT

A disk file having on one side of a disk a servo track and a plurality of data tracks all equally spaced on centers and a carriage translatable across the disk and having an array of read/write heads some of which are spaced on centers for the distance equal to the spacing between adjacent ones of said tracks and others of which are spaced on centers for multiples of the distance between adjacent ones of said tracks, the spacing between heads being such that when said heads are successively in alignment with said servo track the others of said heads are aligned with said data tracks.

8 Claims, 11 Drawing Figures

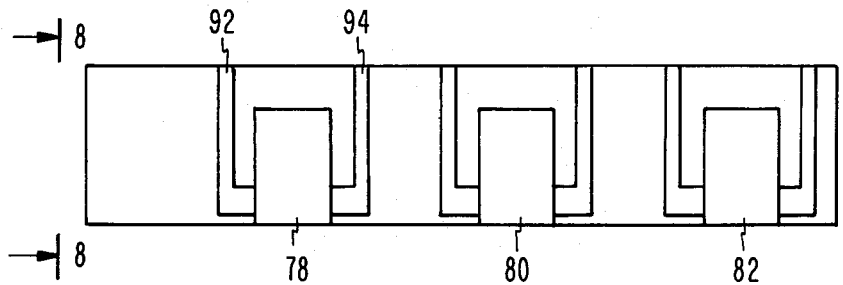
FIG. 7
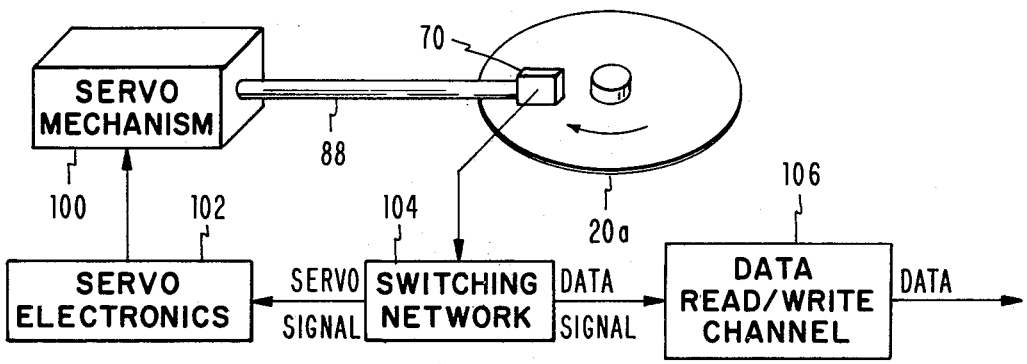
FIG. 9
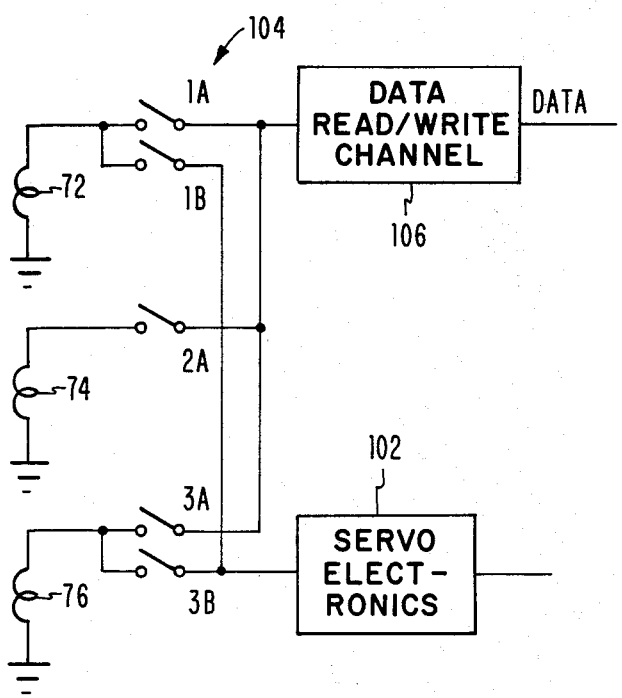
FIG. 10
| R/W | 1A | 1B | 2A | 3A | 3B |
|---|---|---|---|---|---|
| A₄ | + | − | − | − | + |
| B₄ | + | − | − | − | + |
| C₄ | − | − | + | − | + |
| D₄ | − | − | + | − | + |
| E₄ | − | + | + | − | − |
| F₄ | − | + | + | − | − |
| G₄ | − | + | − | + | − |
| H₄ | − | + | − | + | − |
+ = CLOSED     − = OPEN
FIG. 11

MAGNETIC DISK FILE

This is a continuation of application Ser. No. 546,066 filed Jan. 31, 1975, now abandoned.

BACKGROUND OF THE INVENTION

The invention relates to magnetic disk files and more particularly to carriages having magnetic heads for sensing a servo track on a magnetic disk and for reading from and writing on associated data tracks, the servo track and data tracks being provided on the same recording surface of the disk.

Some prior track following concepts have incorporated a single servo read head to follow a prewritten servo track on a recording disk. One such file uses a servo head on the bottom of a disk to access and locate two data heads on the top surface of the disk. In such a system, 66% of the total used disk surface is used for data. This efficiency can be enhanced by stacking many disks and using only one servo surface, and this approach is employed on large files. Unfortunately, the ultimate track density is limited by the many mechanical tolerances that build up from head to head and disk to disk. This limitation is particularly acute when the disks are made of thin flexible media which has poor dimensional stability. Such a type of media dictates for reasonably high track densities that the servo information must be included on the same disk as the data; and, in most cases, it must be on the same side of the disk as the data.

Recent technology efforts using thin film head arrays utilize multitrack heads to do the track following function in addition to the reading and writing functions. Such an arrange may include six read only servo heads used to track follow and a separate read/write head used for data transfer. One servo track is located at one end of a series of data tracks (such as six data tracks), and an array of six servo heads are aligned consecutively with the servo track in order to bring the single read/write head in alignment with the six data tracks. This approach, therefore, yields six data tracks per servo track or 6/7=85.7% usage of the disk for data storage. This approach also results in a rather complex head assembly that must be as wide as the number of tracks in a band (seven tracks in this case). There are also cross talk exposures on the servo heads closest to the read/write head.

SUMMARY OF THE INVENTION

It is an object of the present invention to provide improved arrays of magnetic heads usable in connection with magnetic disks which maximize the number of tracks accessible per head, utilizing heads which inherently provide both read and write functions in order to minimize the cost of such arrays which increases with the number of heads. Appropriate servo tracks are included on the same side of the disk as the data tracks so that the disks may be made of thin flexible media and so that a maximum amount of data may be stored on the disk.

In a preferred form of the invention, the magnetic disk is provided with a single servo track and a plurality of data tracks on each side of the servo track, all of the tracks being equally spaced apart on centers radially of the disk. The head array includes a pair of magnetic heads which are spaced the same distance apart on centers as the tracks and a third magnetic head spaced from one of the first heads twice this distance. In another preferred form of the invention, additional data tracks are provided on each side of the servo track and a fourth magnetic head is included in the array which is spaced from another of the heads in the array a distance three times the spacing of the magnetic tracks. Still other embodiments of the invention utilizing one or more servo tracks are possible.

BRIEF DESCRIPTION OF THE DRAWINGS

FIG. 7 is a sectional view taken on line 7—7 of FIG. 6;

FIG. 9 is a block diagram of a data and servo information transferring system that may be used with the magnetic head array of FIG. 6;

FIG. 10 is a diagram showing a switch arrangement that may be used in the switching network illustrated in block form in FIG. 9; and FIG. 11 is a diagram showing the condition of the switches of the FIG. 10 arrangement for reading and writing on the various data tracks shown in the FIG. 6 representation.

DESCRIPTION OF THE PREFERRED EMBODIMENTS

Figure 1:
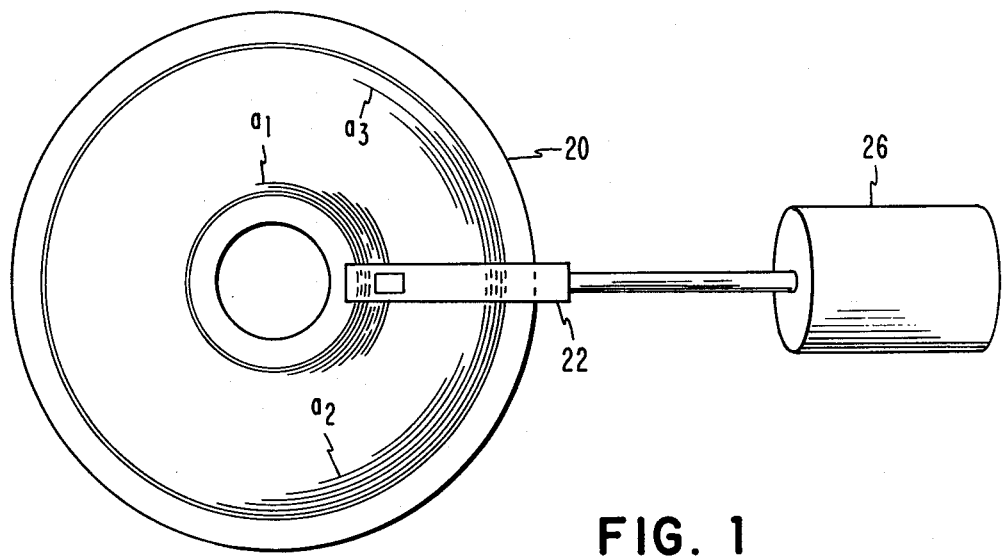
FIG. 1 is a plan view of a magnetic disk having a plurality of servo tracks written on it, a carriage carrying an array of magnetic heads to translate across the disk radially thereof and a motor for propelling the carriage and magnetic head array.

Referring to FIG. 1, a magnetic disk 20, which is rotatable about its center, has a carriage 22 mounted above it carrying an array 24 of magnetic heads. The disk 20 may be of a thin flexible sheet material, such as polyethylene terephthalate, and may have a thickness of 0.007 inch, for example. A motor 26 is suitably connected with the carriage 22 for moving the array 24 across the surface of the disk 20. A series of servo tracks $a_1$, $a_2$ and $a_3$, etc. are written on the surface of the disk 20 over which the carriage 22 and magnetic head array 24 move.

Figure 2:
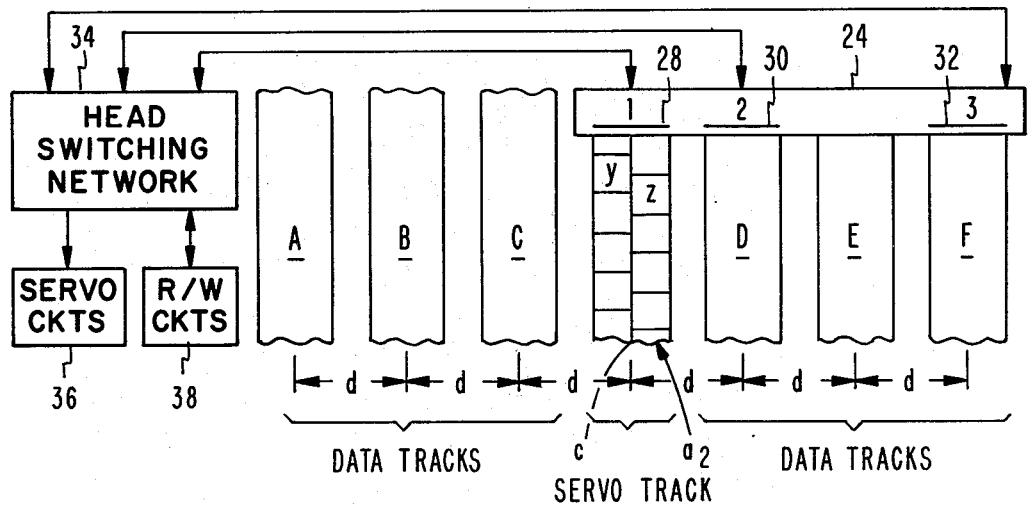
FIG. 2 is a diagrammatic illustration of a band of a plurality of data tracks and a servo track on the surface of the disk, a plurality of read/write heads carried in an array, and circuitry connected to the read/write heads, the magnetic heads being spaced apart once or twice the spacing of the tracks apart so that the magnetic heads may register with all of the tracks.

FIG. 2 shows the servo track $a_2$, for example, together with data tracks A, B, C, D, E and F. The track $a_2$, measured from its center c, and tracks A–F also measured from their centers are all the same distance d apart radially of the disk 20. It will be observed that the servo track $a_2$ is formed by the two halves y and z of out of phase encoding, and the other servo tracks on the disk 20 may be considered to be of the same type.

Referring to FIG. 2, the array 24 includes the magnetic heads 28, 30 and 32. The heads 28 and 30 are spaced the distance d apart on their centers, while the heads 30 and 32 are spaced apart for a distance of 2d on their centers. The heads 28, 30 and 32 are connected with a head switching network 34 which in turn is connected with servo circuits 36 and read/write circuits 38.

It will be understood that on the sides of each of the servo tracks $a_1$, $a_3$, etc. there are data tracks that correspond with the data tracks A, B, C, D, E and F illustrated in FIG. 2, with six data tracks being disposed between consecutive servo tracks on the disk 20. The illustrated track bearing surface of the magnetic disk 20 may be considered to be filled with these data and servo tracks, and the tracks extend from near the servo track $a_1$ to near the edge of the disk 20.

The heads 28, 30 and 32 are all of the type which allow both a reading and writing action to occur using the heads. In view of this fact, and also in view of the fact that the heads 28 and 30 are spaced the distance d apart and the heads 30 and 32 are spaced the distance 2d apart, different pairs of the data tracks A–F may at the same time have two of these magnetic heads in alignment with them for a reading or writing action, depending upon the adjusted position of the array 24, while the third head is in alignment with the servo track $a_2$ for the purpose of maintaining the array 24 fixed with respect to the data tracks. More particularly, when head 32 is positioned over servo track $a_2$, head 28 is in alignment with data track A; and data track A may have its information read therefrom using head 28 or head 28 may be used for writing information on data track A. The array 24 is maintained in the same position for reading or writing on data track B; and, in this case, head 30 is in alignment with data track B and reads from or writes on data track B. In order to read from or write on data track C, the array 24 is shifted to align head 28 with data track C; and head 30 is then in alignment with servo track $a_2$ for track following. Data track D may be read from or written on using head 30; and head 28 is, under these conditions, in alignment with servo track $a_2$. The array 24 is then in its position as illustrated in FIG. 2. The information on data track E is read or information is written on data track E by shifting the array 24 to move head 32 in alignment with data track E. In this case, head 30 is in alignment with the servo track $a_2$ for holding the array in this position. The information on data track F is read using head 32; and head 28 is, under these conditions, in alignment with servo track $a_2$. The array 24 is under these conditions in its illustrated position as shown in FIG. 2.

It is apparent from FIG. 2 that by following the servo track $a_2$ with head 28, data tracks D and F can be addressed by heads 30 and 32 respectively. Likewise, the other data tracks can be addressed when array 24 is in its other shifted positions as above described. This addressing is accomplished by means of the head switching network 34, the principles of operation of which will be shortly explained in greater detail. Also, the switching network 34 may be utilized to allow connection of any of the three heads 28, 30 and 32 with the servo follow control circuits 36 and the read/write circuits 38 for reading from or writing on any of the data tracks while maintaining the array in its desired shifted position.

It follows from a mathematical analysis that by using read/write heads (heads 28, 30 and 32 in FIG. 2, for example) for both following a servo track and for read/write functions, an array of N number of heads can be made to access $N(N-1)$ data tracks per servo track, where N is less than or equal to 4. The configuration for a four head assembly array 40 is shown in FIG. 3, and the FIG. 3 configuration yields 12/13 = 92.4% usage of the disk 10 for data storage.

Figure 3:
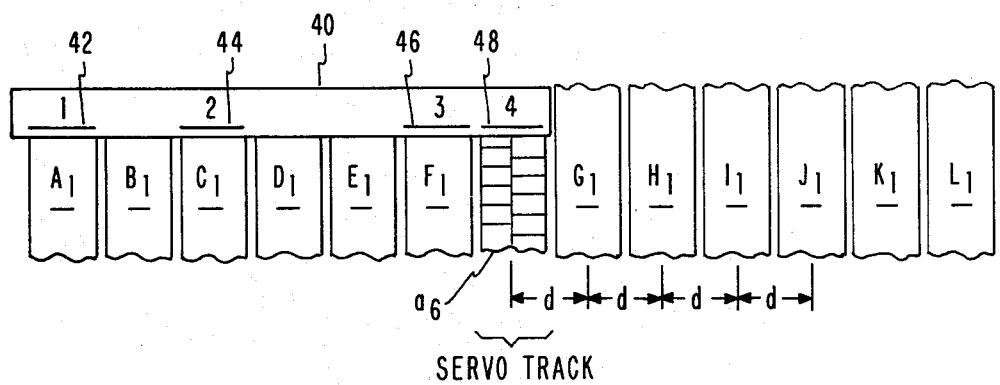
FIGS. 3, 4, 5 and 6 are representations of other bands of one or more servo tracks and data tracks on opposite sides of the servo tracks, with the spacings of the heads in the illustrated arrays being one or more times the spacings of the tracks apart so that the heads may register with all of the tracks.

A servo track $a_6$ is illustrated in FIG. 3, and data tracks $A_1$, $B_1$, $C_1$, $D_1$, $E_1$, $F_1$, $G_1$, $H_1$, $I_1$, $J_1$, $K_1$ and $L_1$ are shown on the sides of the servo track $a_6$. In this case, six data tracks $A_1$–$F_1$ are located on one side of the servo track $a_6$, and six data tracks $G_1$–$L_1$ are located on the other side of the servo track $a_6$. The tracks in the FIG. 3 illustration are all located the distance d apart. The array 40 includes the heads 42, 44, 46 and 48. The heads 46 and 48 are located the distance d apart on their centers; the head 44 is located the distance 3d from the head 46 on their centers; and the head 42 is located a distance 2d from the head 44 on their centers. Using the same analysis of the FIG. 3 arrangement as was used in connection with the FIG. 2 arrangement, it will be apparent that one of the heads 42, 44, 46 and 48 is always in register with the servo track $a_6$, when each of the data tracks $A_1$–$L_1$ has one of the heads 42, 44, 46 and 48 in alignment with it for reading information from or writing on the data track. In all of these cases, the servo track in register with one of the heads 42, 44, 46 and 48 maintains the array 40 in proper position for reading information from or writing on a data track.

Figure 4:
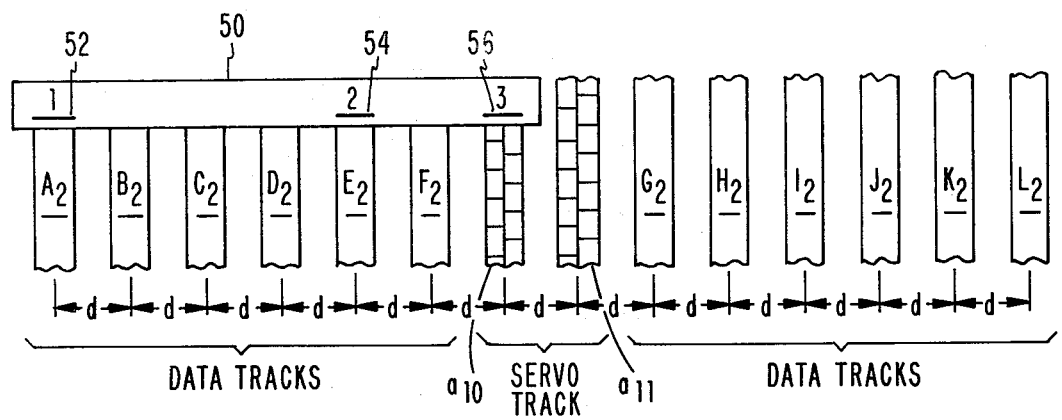

If more data tracks are to be accessed per band or group of tracks with the same number of magnetic heads, a plurality of servo tracks can be placed side by side; and the magnetic heads may be spaced in this case farther apart. This does not increase the overall efficiency, but it does double the number of tracks in a band. An example of this for a three head system is shown in FIG. 4. In the FIG. 4 arrangement, the two servo tracks are the tracks $a_{10}$ and $a_{11}$. Six data tracks, $A_2$–$F_2$ are disposed on one side of the pair of servo tracks $a_{10}$, $a_{11}$; and six data tracks $G_2$–$L_2$ are disposed on the other side of this pair of servo tracks. All of the tracks in the FIG. 4 arrangement are located a distance d apart. The head array 50 includes the heads 52, 54 and 56. The heads 54 and 56 are located a distance 2d apart on their centers, and the head 52 is located a distance 4d from the head 54 on their centers. An analysis similar to the analyses for the FIG. 2 and FIG. 3 arrangements will indicate that one of the heads 52, 54 or 56 is always in register with one of the servo tracks $a_{10}$ or $a_{11}$ when the other heads in the array 50 are used to register with one of the data tracks. All of the data tracks $A_2$–$L_2$ may thus be accessed in this manner. It is apparent that 12 data tracks are accessed by the 3 heads 52, 54 and 56 in the FIG. 4 arrangement while the 3 heads 28, 30 and 32 of the FIG. 2 arrangement only access 6 data tracks. The two arrangements thus have bands including 12 and 6 data tracks respectively.

Figure 5:
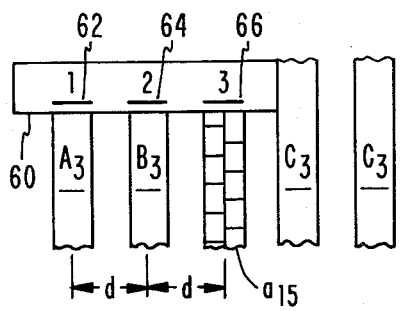

FIG. 5 shows an arrangement of a servo track $a_{15}$ and data tracks $A_3$–$D_3$, with a head array 60 carrying three equally spaced heads 62, 64 and 66 located distances d apart on their centers. The heads 62, 64 and 66 and also the tracks $a_{15}$ and $A_3$–$D_3$ are all spaced a distance d apart. Using the FIG. 5 arrangement, coverage of $2(N-1)$ data tracks per servo track can be obtained which for the three head system illustrated in FIG. 5 will yield 4/5 = 80% efficiency, where N equals the number of magnetic heads.

Figure 6:
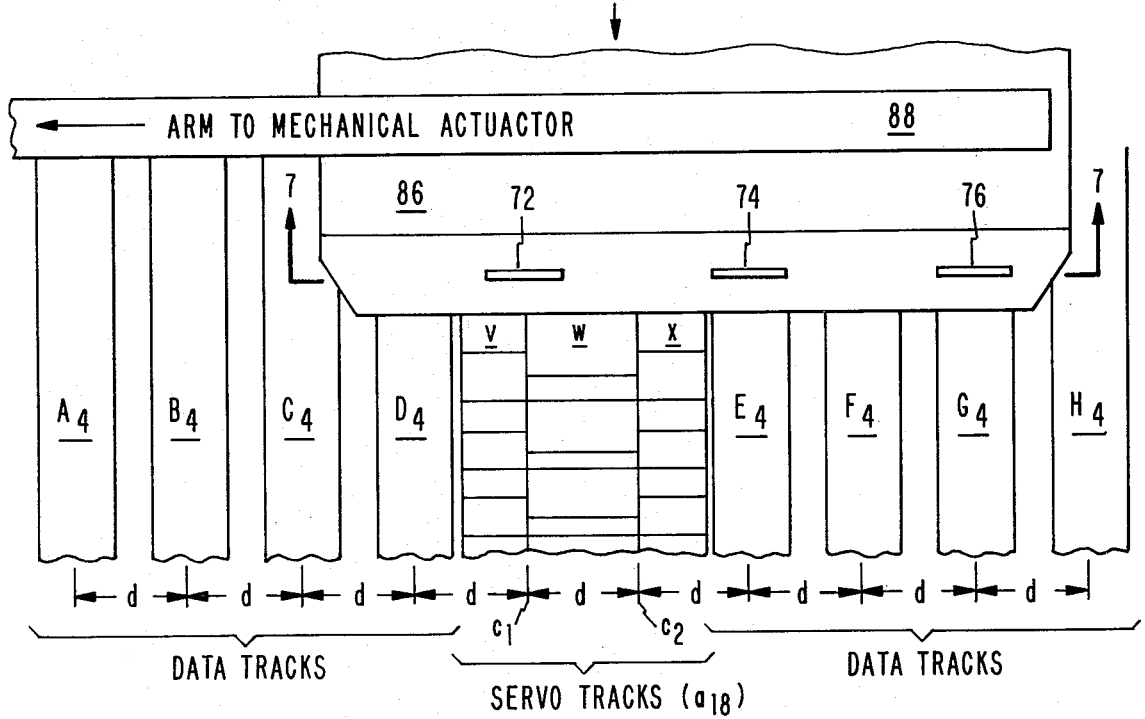

FIG. 6 shows an arrangement of a servo track $a_{18}$ and data tracks $A_4$–$H_4$, with a head array 70 carrying equally spaced magnetic heads 74 and 76. The servo track $a_{18}$ is of a different type than the servo tracks previously described and includes three parts v, w and x. The central part w has a width of d, and the parts v and x are considerably narrower. Since the central part w of the servo track $a_{18}$ is d wide, servo track $a_{18}$ constitutes in effect two of the servo tracks previously described positioned side by side; and the center lines $c_1$ and $c_2$ constitute respectively the centers of the two servo tracks. The data tracks $A_4$–$D_4$ are all the distance d apart, center to center, and the same is true for the data tracks $E_4$–$H_4$. The center of the track $D_4$ and the center line $c_1$ of the servo track $a_{18}$ are also spaced the distance d apart, and the same is true of the center of the track $E_4$ and the center line $c_2$ of the servo track $a_{18}$. The magnetic heads 72, 74 and 76 are equally spaced apart by distances 2d based on the centers of the magnetic heads.

Figure 8:
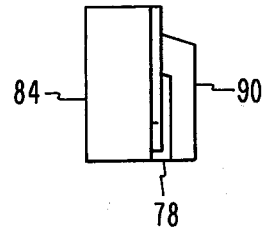
FIG. 8 is an end view of the structure shown in FIG. 7 and taken on line 8—8 of FIG. 7.

It will be observed from FIGS. 7 and 8 that the magnetic heads 72, 74 and 76 respectively have gaps 78, 80 and 82. The array 70 is based on a ferrite substrate 84 which is bonded on a slider 86; and the slider 86 is in turn bonded on an actuator arm 88 (see FIG. 6). A ferrite closure 90 is fixed with respect to the substrate 84, and gold head leads 92 and 94 are provided in connection with each of the heads 72, 74 and 76. The array 70, including the construction just described, is a so-called "thin film" head array.

The system for moving the array 70 across disk $20a$ is shown in FIG. 9 and includes servo mechanism 100, servo electronics 102, a switching network 104 and a data read channel 106. The switching network 104 is illustrated in greater detail in FIG. 10 and may be seen to include the switches 1A, 1B, 2A, 3A and 3B. The switches 1A and 1B are connected with the magnetic head 72; the switch 2A is connected with the head 74; and the switches 3A and 3B are connected with the head 76. The switches 1A, 2A and 3A are connected with the data read/write channel 106, and the switches 1B and 3B are connected with the servo electronics 102.

For a reading or writing action with respect to the data tracks $A_4$–$H_4$, the various switches 1A, 1B, 2A, 3A and 3B are controlled in the manner indicated by the chart of FIG. 11, with the symbol "+" indicating that the corresponding switch is closed and the symbol "−" indicating that the corresponding switch is open. For example, for a reading or writing action with respect to the data track $A_4$, the switches 1A and 3B are closed, while the switches 1B, 2A and 3A are open.

It will be observed from the FIG. 11 chart that all of the magnetic heads of the array 70 are not used for collecting servo information from the servo track $a_{18}$ of FIG. 6, unlike the other described arrangements in which all of the magnetic heads of the corresponding arrays at times collect servo information as well as data information. This is due to the equally spaced arrangement of the magnetic heads 72, 74 and 76 and the particular arrangement of the servo track $a_{18}$.

Switching networks corresponding to the switching network 104 may, of course, be used with the other previously described arrangements; and this is true also of the servo mechanisms, servo electronics and read/write channels. Conventional servo mechanisms, serve electronics and read/write channels can, of course, be used with all of the arrangements of servo tracks and data tracks above described. The switches of the switching network 104 (and also any switches in corresponding switching networks for the other previously described arrangements) can be manually controlled, if desired; however, it is contemplated that preferably the switches shall be automatically controlled by a suitable control mechanism. It is also understood that thin film head arrays, similar to that shown in FIGS. 6, 7 and 8 may also be used for the previously described arrangements of servo and data tracks.

The arrangements of servo and data tracks shown in FIGS. 2–6 may be seen to yield higher data storage efficiency than present means, without requiring exceedingly costly and complex head arrays. Also, with the magnetic heads being substantially spaced as shown in FIGS. 4 and 6, crosstalk problems are reduced.

Although the data tracks A–F and the servo track $a_2$ in the FIG. 2 embodiment and the other servo tracks and data tracks in the other embodiments have been described in connection with the disk 20, it will be understood that these tracks could instead be provided on a continuous length of magnetic material such as a tape; and the respective head arrays, such as the head array 24 in the FIG. 2 embodiment, could be made translatable across these tracks disposed on the continuous length medium.

It is believed that the construction of the thin film heads 72, 74 and 76 will be apparent from the above description and also from FIGS. 6, 7 and 8; however, for more information on the construction and operation of such heads, the following articles from the *IEEE Transactions On Magnetics*, Vol. MAG-9, No. 3, September, 1973, may be referred to:

1. "Performance of Single-Turn Film Heads," by E. P. Valstyn and L. F. Shew, pages 317–322.
2. "Integrated Magnetic Recording Heads Applications," by Jean-Pierre Lazzari, pages 322–326.

We claim:
1. A storage medium access mechanism comprising:
   a medium capable of storing information on a face thereof and having on said face a band of "X" servo tracks wherein "X" is an integer,
   each of said servo tracks including a pair of side-by-side subtracks with out of phase encoding and having a boundary therebetween which constitutes the effective center of the servo track,
   a plurality of data tracks on each side of said band and which on each side of said band are equal in number and are greater in number than the number of said servo tracks and each of the data tracks having an effective center,
   said centers of said data and servo tracks being uniformly spaced apart by a certain distance "d" between adjacent ones of said servo and data track centers,
   a head array having a series of information transferring heads which are fixed with respect to each other and which are less in number than the number of said data tracks on each side of said servo track band plus one, and
   means for providing relative transverse movement between said tracks and said head array so that the head array has a plurality of stepped positions across said tracks which are a distance "d" apart and in all of which said heads are in alignment on their centers with centers of certain ones of said tracks,
   each of said heads being spaced from an adjacent one of said heads on their centers by said certain distance "d" multiplied by a certain integral number for each of said heads, the spacing on centers between the end heads of said series being equal to the spacing on centers of the end data track on each side of said servo band and the nearest servo track of said band, said integral numbers and spacings between said heads having such a relationship so that all of said data tracks each has one of said heads in register with it center to center at which data information is transferred at a certain one of said stepped relative positions of said head array with respect to said tracks and another of said heads has its center in register with a said effective center of one of said servo tracks at which servo information is transferred at this certain relative position of said head array with respect to said tracks.

2. A storage medium access mechanism as set forth in claim 1 and including:
   servo follow control circuits;
   data transfer circuits; and
   a head switching network for connecting each of said heads, when the head is in alignment with a said data track, with said data transfer circuits and for simultaneously connecting another of said heads, which is in alignment with a said servo track, with said servo follow control circuits.

3. A storage medium access mechanism as set forth in claim 1,
   said medium capable of storing information on a face thereof constituting a magnetic disk which is rotatable about its center and said tracks constituting circular tracks on said disk which are concentric with said disk center,
   said means for providing relative transverse movement between said tracks and said head array including a motor connected to said head array for thereby moving said heads with respect to said magnetic disk.

4. A magnetic medium access mechanism as set forth in claim 3,
   said quantity "X" constituting the integer 1 so that said band constitutes a single servo track,
   a second one of said heads in said series being spaced from an adjacent first one of said heads in said series the distance "d" on their centers and a third one of said heads in said series being spaced from said second one of said heads in said series a distance 2"d" on their centers.

5. A magnetic medium access mechanism as set forth in claim 3,
   said quantity "X" constituting the integer 1 so that said band constitutes a single servo track,
   a second one of said heads in said series being spaced from an adjacent first one of said heads in said series by a distance "d" on their centers,
   a third one of said heads in said series being spaced from the adjacent said second one of said heads in said series by a distance 3"d" on their centers and
   a fourth one of said heads in said series being spaced from the adjacent said third one of said heads in said series by a distance 2"d" on their centers.

6. A magnetic medium access mechanism as set forth in claim 3,
   said quantity "X" constituting the integer 2 so that said band constitutes two servo tracks side-by-side,
   a second one of said heads in said series being spaced from an adjacent first one of said heads in said series by a distance 2"d" on their centers and
   a third one of said heads in said series being spaced from the adjacent said second one of said heads in said series by a distance 4"d" on their centers.

7. A storage medium access mechanism comprising:
   a medium capable of storing information on a face thereof and having on said face a band of "X" servo tracks wherein "X" is an integer,
   each of said servo tracks including a pair of side-by-side subtracks with out of phase encoding and having a boundary therebetween which constitutes the effective center of the servo track,
   a plurality of data tracks on each side of said band and which on each side of said band are equal in number and are greater in number than the number of said servo tracks and each of the data tracks having an effective center,
   said centers of said data and servo tracks being uniformly spaced apart by a certain distance "d" between adjacent ones of said servo and data track centers,
   a head array having a series of information transferring heads which are fixed with respect to each other and which are less in number than the number of said data tracks on each side of said servo track band plus one, and
   means for providing relative transverse movement between said tracks and said head array so that the head array has a plurality of stepped positions across said tracks which are a distance "d" apart and in all of which said heads are in alignment on their centers with centers of certain ones of said tracks,
   each of said heads being spaced from an adjacent one of said heads on their centers by said certain distance "d" multiplied by a certain integral number for each of said heads, the spacing on centers between the end heads of said series being equal to the spacing on centers of the end data track on each side of said servo band and the nearest servo track of said band, said integral numbers and spacings between said heads having such a relationship so that all of said tracks each has one of said heads in register with it center to center at which data information is transferred at a certain one of said stepped relative positions of said head array with respect to said tracks and another of said heads has its center in register with a said effective center of one of said servo tracks at which servo information is transferred at this certain relative position of said head array with respect to said tracks,
   said medium capable of storing information on a face thereof constituting a magnetic disk which is rotatable about its center and said tracks constituting circular tracks on said disk which are concentric with said disk center,
   said means for providing relative transverse movement between said tracks and said head array including a motor connected to said head array for thereby moving said heads with respect to said magnetic disk,
   said quantity "X" constituting the integer 2 so that said band constitutes a pair of servo tracks disposed side-by-side,
   said data tracks constituting an even number of data tracks on each side of said band,
   said heads being uniformly spaced apart with a certain distance of 2 times said certain distance "d" between adjacent ones of said heads in said head array on their centers.

8. A storage medium access mechanism comprising:

a medium capable of storing information on a face thereof and having on said face a band of "X" servo tracks wherein "X" is an integer, each of said servo tracks including a pair of side-by-side subtracks with out of phase encoding and having a boundary therebetween which constitues the effective center of the servo track, a pluarlity of data tracks on each side of said band and which on each side of said band are equal in number and are greater in number than the number of said servo tracks and each of the data tracks having an effective center, said centers of said data and servo tracks being uniformly spaced apart by a certain distance "d" between adjacent ones of said servo and data track centers, a head array having a series of information transferring heads which are fixed with respect to each other and which are less in number than the number of said data tracks on each side of said servo track band plus one, and means for providing relative transverse movement between said tracks and said head array so that the head array has a plurality of stepped positions across said tracks which are a distance "d" apart and in all of which said heads are in alignment on their centers with centers of certain ones of said tracks, each of said heads being spaced from an adjacent one of said heads on their centers by said certain distance "d" multiplied by a certain integral number for each of said heads, the spacing on centers between the end heads of said series being equal to the spacing on centers of the end data track on each side of said servo band and the nearest servo track of said band, said integral numbers and spacings between said heads having such a relationship so that all of said data tracks each has one of said heads in register with it center to center at which data information is transferred at a certain one of said stepped relative positions of said head array with respect to said tracks and another of said heads has its center in register with a said effective center of one of said servo tracks at which servo information is transferred at this certain relative position of said head array with respect to said tracks, said medium capable of storing information on a face thereof constituting a magnetic disk which is rotatable about its center and said tracks constituting circular tracks on said disk which are concentric with said disk center, said means for providing relative transverse movement between said tracks and said head array including a motor connected to said head array for thereby moving said heads with respect to said magnetic disk, said quantity "X" constituting the integer 2 so that said band constitutes a pair of servo tracks disposed side-by-side, said data tracks constituting four data tracks on each side of said band, said heads being three in number and being uniformly spaced apart with a certain distance of two times said certain distance "d" between adjacent ones of said heads in said array on their centers.

* * * * *